(12) United States Patent
Qi et al.

(10) Patent No.: US 12,177,376 B2
(45) Date of Patent: Dec. 24, 2024

(54) COORDINATED CONTROL METHOD AND SYSTEM FOR ELECTRONIC DEVICES

(71) Applicant: HUAWEI TECHNOLOGIES CO., LTD., Shenzhen (CN)

(72) Inventors: Changle Qi, Shenzhen (CN); Bifeng Tong, Shenzhen (CN); Fei Wang, Wuhan (CN); Yuchi Ma, Shenzhen (CN); Ben Zhou, Wuhan (CN); Jiajia Hu, Wuhan (CN); Weifeng Cui, Wuhan (CN); Dezhi Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/014,591

(22) PCT Filed: Jul. 7, 2021

(86) PCT No.: PCT/CN2021/105039
§ 371 (c)(1),
(2) Date: Jan. 5, 2023

(87) PCT Pub. No.: WO2022/007856
PCT Pub. Date: Jan. 13, 2022

(65) Prior Publication Data
US 2023/0254399 A1    Aug. 10, 2023

(30) Foreign Application Priority Data
Jul. 8, 2020    (CN) .......................... 202010651585.9

(51) Int. Cl.
H04M 1/72412    (2021.01)
G06F 3/14    (2006.01)
(Continued)

(52) U.S. Cl.
CPC ...... *H04M 1/72412* (2021.01); *G06F 3/1423* (2013.01); *G06F 9/547* (2013.01); *H04W 4/80* (2018.02)

(58) Field of Classification Search
CPC .. H04M 1/72412; G06F 3/1423; G06F 9/547; H04W 4/80; G09G 5/14;
(Continued)

(56) References Cited

U.S. PATENT DOCUMENTS

2013/0258206 A1    10/2013    Li
2013/0326397 A1*    12/2013    Kim ...................... G06F 3/0484
                                                              715/781
(Continued)

FOREIGN PATENT DOCUMENTS

CN    103686404 A    3/2014
CN    104331243 A    2/2015
(Continued)

*Primary Examiner* — Cao H Nguyen
(74) *Attorney, Agent, or Firm* — Rimon PC

(57) ABSTRACT

This application discloses a coordinated control method and system for electronic devices. When triggering coordinated control, a second electronic device sends remote view logic information associated with a running business to a first electronic device. The first device directly locally loads an application-related interface based on an interface layout file included in the remote view logic information. In this way, for the first device end, a component, a parameter, and the like that are related to the running application of the second device do not need to be customized on the first device end for the running application, and only the remote view logic information transmitted to the first device needs to be loaded. Distributed application logic may be defined for all running applications of the second device on a side of the second device, and then the second device synchronizes the distributed application logic with the first device.

18 Claims, 9 Drawing Sheets

(51) Int. Cl.
*G06F 9/54* (2006.01)
*H04W 4/80* (2018.01)

(58) Field of Classification Search
CPC .......... G09G 2340/145; G09G 2370/16; H04L 67/10; H04N 21/4122
See application file for complete search history.

(56) References Cited

U.S. PATENT DOCUMENTS

2015/0065056 A1* 3/2015 Won .................. H04M 1/72403
455/41.3
2021/0303253 A1* 9/2021 Hwang .................. G06Q 20/02

FOREIGN PATENT DOCUMENTS

| | | | |
|---|---|---|---|
| CN | 104333791 A | | 2/2015 |
| CN | 104683843 A | * | 6/2015 |
| CN | 105120327 A | | 12/2015 |
| CN | 106162364 A | | 11/2016 |
| CN | 106506488 A | | 3/2017 |
| CN | 104461052 B | | 5/2018 |
| CN | 110381195 A | | 10/2019 |
| CN | 111324327 A | | 6/2020 |
| EP | 3091747 A1 | | 11/2016 |
| EP | 4095671 A1 | | 11/2022 |

* cited by examiner

COORDINATED CONTROL METHOD AND SYSTEM FOR ELECTRONIC DEVICES

This application is a National Stage of International Application No. PCT/CN2021/105039, filed on Jul. 7, 2021, which claims priority to Chinese Patent Application No. 202010651585.9, filed on Jul. 8, 2020, both of which are hereby incorporated by reference in their entireties.

TECHNICAL FIELD

This application relates to the field of terminal technologies, and in particular, to a coordinated control method and system for electronic devices.

BACKGROUND

With the development of science and technology, intelligent devices have become one of peoples' daily necessities. An intelligent device is a product obtained after a conventional electrical device is combined with a computer technology, a data processing technology, a control theory, a sensor technology, a network communication technology, a power electronics technology, and the like. Some intelligent devices include a first intelligent device and a second intelligent device. The first intelligent device is a computer device that can control the use of the second intelligent device, and includes a smartphone, a notebook computer, a desktop computer, and the like. The second intelligent device is a system device that processes and controls media information by using the computer technology and a digital communication network technology, such as a smart TV, a head unit, a watch, and a sound box. Between the first intelligent device and the second intelligent device, coordinated control may be performed on the second intelligent device by the first intelligent device. A conventional practice in which the first intelligent device performs coordinated control on the second intelligent device is to create a set of application protocols between an application of the first intelligent device and an application of the second intelligent device, so that coordinated control of the application of the first intelligent device and an application of the second intelligent device is implemented by using a protocol rule, a parameter, and the like. For example, a mobile phone controls a smart TV to switch programs, and the smart TV transfers display area layout information and a thumbnail of each display area to a host application on the mobile phone end. The mobile phone end reconstructs a display picture based on the display area layout information and the thumbnail of each display area, and displays the display picture on the mobile phone end. In the foregoing manner, a corresponding scenario needs to be simultaneously customized on the mobile phone end and the smart TV end. When the smart TV end switches a current scenario, the mobile phone end is no longer applicable to a scenario obtained after the smart TV performs switching. Consequently, the applicable scenario is limited.

SUMMARY

The present invention provides a coordinated control method and system for electronic devices, to adapt to a wide range of scenarios.

According to a first aspect, an embodiment of this application provides a coordinated control method for electronic devices. An electronic device includes a first electronic device used as a controlling party and a second electronic device used as a controlled party that are connected based on near field communication. The coordinated control method includes:

the second electronic device runs an application and triggers coordinated control, and sends remote view logic information associated with the application to the first electronic device, where the remote view logic information includes an interface layout file;

the first electronic device receives the remote view logic information, locally loads, based on the interface layout file, an interface related to the application, and binds a service that is on a side of the second electronic device and that is related to the application; and the first electronic device sends control information to the second electronic device based on a service interface externally disclosed by the service, so that the first electronic device controls the second device to run the application.

According to the coordinated control method for electronic devices disclosed in the first aspect of this application, when triggering the coordinated control, the second electronic device sends the remote view logic information associated with the running application to the first electronic device, and the first electronic device directly loads an application-related interface locally based on the interface layout file included in the remote view logic information. In this way, for the first electronic device end, a component, a parameter, and the like that are related to the running application of the second electronic device do not need to be customized on the first electronic device end for the running application, and only the remote view logic information transmitted to the first electronic device needs to be loaded. Distributed application logic may be defined for all running applications of the second electronic device on the side of the second electronic device, and then the second electronic device synchronizes the distributed application logic with the first electronic device. In this way, application scenarios are numerous.

According to some embodiments of the first aspect of this application, the interface layout file includes an application control related to the application.

According to some embodiments of this application, the binding a service that is on a side of the second electronic device and that is related to the application includes:

the first electronic device loads the interface layout file;
the first electronic device constructs a view tree by loading the interface layout file; and
the first electronic device binds the service related to the application in a process of constructing the view tree.

According to some embodiments of the first aspect of this application, the first electronic device locally loads the interface based on a application control for the interface layout file.

According to some embodiments of the first aspect of this application, the control information is transferred by the service interface externally disclosed by the service that is on the side of the second electronic device and that is bound by the first electronic device and related to the application.

According to some embodiments of the first aspect of this application, the first electronic device registers with Call-Back related to the second electronic device, the first electronic device transfers an ICallBack handle to the second electronic device through the service interface, and the second electronic device reversely controls the first electronic device by using the ICallBack handle.

According to some embodiments of the first aspect of this application, when running a specific application, the second electronic device triggers the coordinated control.

According to some embodiments of the first aspect of this application, when running the application and triggering the coordinated control, the second electronic device establishes a data physical channel to the first electronic device based on distributed middleware to transmit the remote view logic information.

According to some embodiments of the first aspect of this application, the data physical channel includes a socket channel.

According to some embodiments of the first aspect of this application, before the data physical channel is established between the first electronic device and the second electronic device, the first electronic device performs device trusted authentication and key credential exchange on the first electronic device and the second electronic device by using the distributed middleware.

According to some embodiments of the first aspect of this application, the distributed middleware separately provides a platform interface for the second electronic device and the first electronic device, to transfer the remote view logic information through the platform interface.

According to some embodiments of the first aspect of this application, the second electronic device transfers the remote view logic information to the first electronic device through the platform interface in a form of a binary digital stream.

According to some embodiments of the first aspect of this application, the platform interface is an interface that implements a cross-process based on a binder mechanism.

According to some embodiments of the first aspect of this application, the coordinated control method further includes:
the first electronic device unbinds, based on the distributed middleware, the service that is bound on the side of the second electronic device and that is related to the application.

According to some embodiments of the first aspect of this application, when running the application, the second electronic device refreshes an interface on the side of the second electronic device based on the control information.

According to a second aspect, an embodiment of this application discloses a coordinated control system for electronic devices, and the coordinated control system includes a first electronic device and a second electronic device.

The first electronic device is used as a controlling party, the second electronic device is used as a controlled party, and the first electronic device and the second electronic device are connected based on near field communication.

The second electronic device runs an application and triggers coordinated control, and sends remote view logic information associated with the application to the first electronic device, where the remote view logic information includes an interface layout file.

The first electronic device receives the remote view logic information, locally loads an interface based on the layout file, and binds a service that is on a side of the second electronic device and that is related to the application.

The first electronic device sends control information to the second electronic device based on a service interface externally disclosed by the service, so that the first electronic device locally controls the second device to run the application.

According to the coordinated control system for electronic devices disclosed in the second aspect of this application, when triggering the coordinated control, the second electronic device sends the remote view logic information associated with the running application to the first electronic device, and the first electronic device directly loads an application-related interface locally based on the interface layout file included in the remote view logic information. Distributed application logic may be defined for all running applications of the second electronic device on the side of the second electronic device, and then the second electronic device synchronizes the distributed application logic with the first electronic device. In this way, application scenarios are numerous.

According to some embodiments of the second aspect of this application, when the second electronic device runs the application, the first electronic device refreshes an interface on the side of the second electronic device based on the control information after receiving a remote assist request. In addition, to remotely refreshing the interface on the side of the second electronic device, the first electronic device may further perform other control (which may be remote control) on the second electronic device. This is not limited in this embodiment of this application.

According to a third aspect, an embodiment of this application discloses a coordinated control method for electronic devices. The electronic devices include a first electronic device used as a controlling party and a second electronic device used as a controlled party that are connected based on near field communication. The coordinated control method is applied to the second electronic device, and the coordinated control method includes:
running an application and triggering coordinated control, and sending remote view logic information associated with the application to the first electronic device, where the remote view logic information includes an interface layout file;
the first electronic device receives the remote view logic information, locally loads, based on the interface layout file, an interface related to the application, and binds a service related to the application; and
the first electronic device sends control information to the second electronic device based on a service interface externally disclosed by the service, so that the first electronic device locally controls the second device to run the application.

According to the coordinated control method for electronic devices disclosed in the third aspect of this application, when triggering the coordinated control, the second electronic device sends the remote view logic information associated with the running application to the first electronic device, and the first electronic device directly loads an application-related interface locally based on the interface layout file included in the remote view logic information. In this way, for the first electronic device end, a component, a parameter, and the like that are related to the running application of the second electronic device do not need to be customized on the first electronic device end for the running application, and only the remote view logic information transmitted to the first electronic device needs to be loaded. Distributed application logic may be defined for all running applications of the second electronic device on the side of the second electronic device, and then the second electronic device synchronizes the distributed application logic with the first electronic device. In this way, application scenarios are numerous.

According to a fourth aspect, an embodiment of this application discloses a coordinated control method for electronic devices. The electronic devices include a first electronic device used as a controlling party and a second electronic device used as a controlled party that are connected based on near field communication. The coordinated control method is applied to the first electronic device, and the coordinated control method includes:

receiving remote view logic information, where the remote view logic information is related to a running application of the second electronic device, and the remote view logic information includes an interface layout file;

locally loading, based on the interface layout file, an interface related to the application, and binding a service related to the application; and the first electronic device sends control information to the second electronic device based on a service interface externally disclosed by the service, so that the first electronic device locally controls the second device to run the application.

According to the coordinated control system for electronic devices disclosed in the fourth aspect of this application, when triggering the coordinated control, the second electronic device sends the remote view logic information associated with the running application to the first electronic device, and the first electronic device directly loads an application-related interface locally based on the interface layout file included in the remote view logic information. In this way, for the first electronic device end, a component, a parameter, and the like that are related to the running application of the second electronic device do not need to be customized on the first electronic device end for the running application, and only the remote view logic information transmitted to the first electronic device needs to be loaded. Distributed application logic may be defined for all running applications of the second electronic device on the side of the second electronic device, and then the second electronic device synchronizes the distributed application logic with the first electronic device. In this way, application scenarios are numerous.

Other features and corresponding beneficial effects of the present invention are described in a subsequent part of this specification, and it should be understood that at least some beneficial effects become apparent from the descriptions in the specification of the present invention.

DESCRIPTION OF EMBODIMENTS

A coordinated control method for electronic devices provided in embodiments of this application may be applied to any electronic device that has a display. The electronic devices include but are not limited to electronic devices such as a mobile phone, a tablet computer, a laptop computer, a desktop computer, a wearable device, a head mounted display, a mobile e-mail device, a portable game console, a portable music player, a reader device, a personal digital assistant, a virtual reality device or an augmented reality device, and a television set in which one or more processors are embedded or coupled.

A mobile phone 10 and a smart TV 20 are used as examples below to describe technical solutions of this application according to some embodiments of this application.

The technical solutions provided in embodiments of this application are described below based on FIG. 1A, FIG. 1B, FIG. 1C, and FIG. 1D.

Figure 1A:
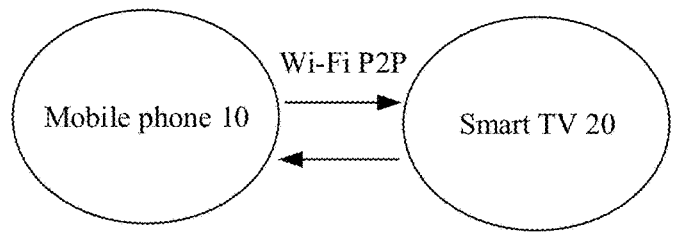
FIG. 1A is a diagram of a scenario of coordinated control of a mobile phone and a smart TV according to an embodiment of this application.

As shown in FIG. 1A, a mobile phone 10 used as a controlling party and a smart TV 20 used as a controlled party communicate with each other based on a near field communication. Networking methods include but are not limited to wireless fidelity peer-to-peer (Wi-Fi P2P) communication, Bluetooth P2P communication, local area network communication, Wi-Fi communication, and the like. In this embodiment of this application, as an example, the Wi-Fi P2P communication manner between the mobile phone 10 and the smart TV 20 is used to implement communication between the mobile phone 10 and the smart TV 20 and coordinated control between the mobile phone 10 and the smart TV 20.

Based on an application scenario provided in this embodiment of this application, the smart TV 20 locally runs an application as the controlled party. For the locally running application, the smart TV 20 sends remote view logic information associated with the locally running application to the mobile phone 10. The remote view logic information includes an interface layout file (such as a application control for the locally running application) of the application locally running on the smart TV 20. After receiving the remote view logic information, the mobile phone 10 locally loads, based on the interface layout file, an interface (such as the application control and a display interface for the application locally running on the smart TV 20) related to the application locally running on the smart TV 20. When the mobile phone 10 loads the remote view logic information, the mobile phone 10 binds a service that is on a side of the smart TV 20 and that is related to the locally running application. Therefore, the mobile phone 10 sends control information to the smart TV 20 based on an interface disclosed by the bound service, so that the mobile phone 10 controls, based on the control information, the smart TV 20 to run the application. It should be noted that the remote view logic information may be customized by the smart TV 20. The interface layout file in the remote view logic information may be the same as an interface layout of the application locally running on the smart TV 20, and the interface layout file in the remote view logic information may alternatively be different from the interface layout of the application locally running on the smart TV 20. This is not limited in this embodiment of this application.

According to some embodiments of this application, a service component is defined on a side of the mobile phone 10 based on the remote view logic information, and the service component includes but is not limited to a service component of an Android system. Certainly, the service component may alternatively be another type based on an actual use situation. This is not limited in this embodiment of this application.

Figure 1B:
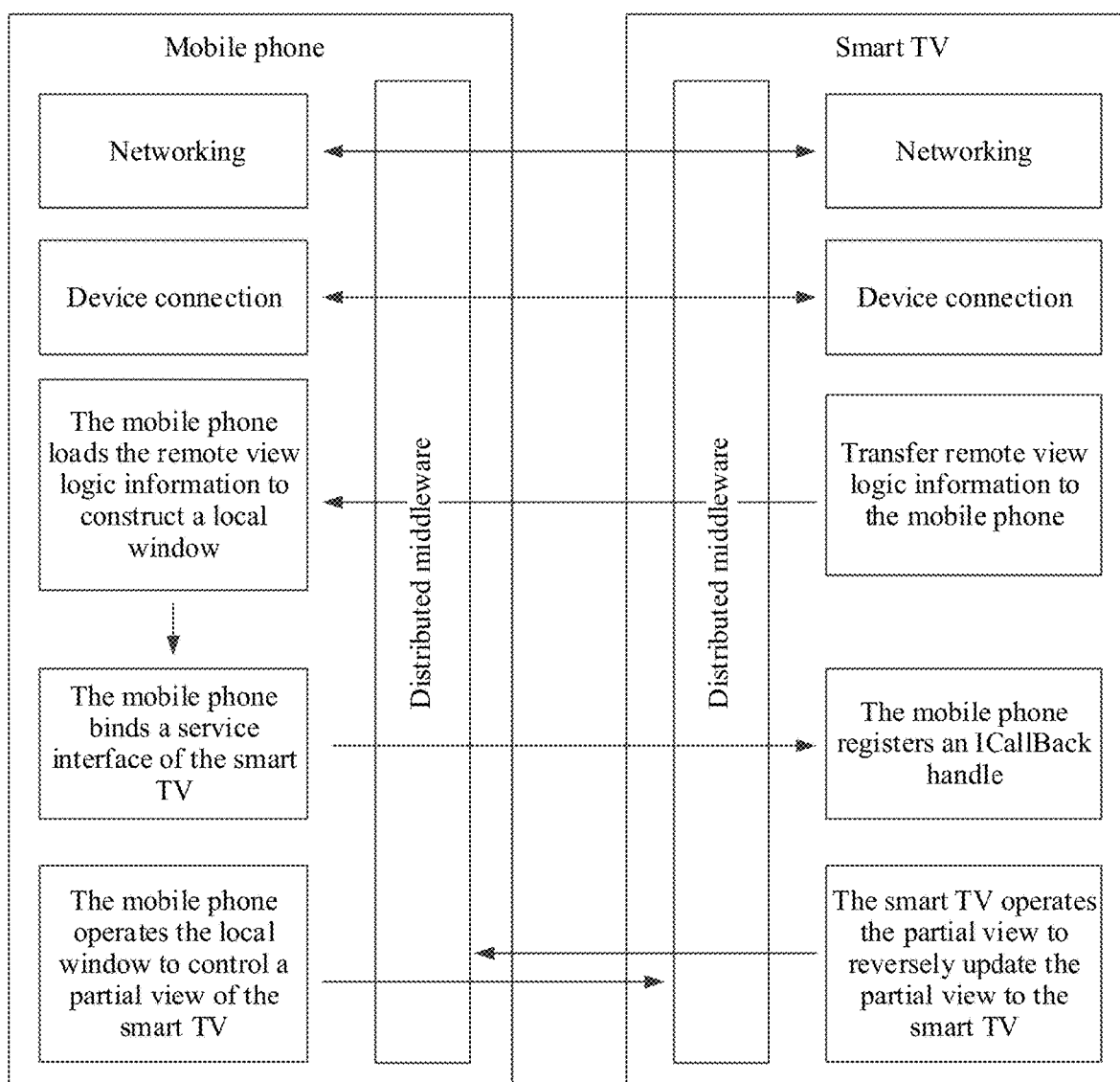
FIG. 1B is a diagram of a structure of coordinated control of a mobile phone and a smart TV according to an embodiment of this application.

According to some embodiments of this application, networking between the mobile phone 10) and the smart TV 20 is a prerequisite for communication between the mobile phone 10 and the smart TV 20. As shown in FIG. 1B, the mobile phone 10 and the smart TV 20 may be networked in the Wi-Fi P2P communication method based on a near field communication network.

After the mobile phone 10 and the smart TV 20 are networked based on Wi-Fi P2P, a connection is established between the mobile phone 10 and the smart TV 20 to transmit the remote view logic information. That the connection is established between the mobile phone 10 and the smart TV 20 may be: When the smart TV 20 runs a specific application, the specific application triggers the smart TV 20 to connect to the mobile phone 10; or when both the mobile phone 10 and the intelligent device 20 are in a same near field network, a host module of the smart TV 20 and a host module of the mobile phone 10 are triggered, so that the smart TV 20 and the mobile phone 10 are connected by using the host module of the smart TV 20 and the host module of the mobile phone 10.

According to some embodiments of this application, that the specific application triggers to connect the smart TV 20 and the mobile phone 10 is specifically: When the smart TV 20 is switched to the specific application and runs the specific application, coordinated control is triggered. The smart TV 20 performs trusted authentication and key credential exchange on the mobile phone 10 based on distributed middleware. After the smart TV 20 and the mobile phone 10 complete trusted authentication and key credential exchange, a data physical channel (which may be a socket physical channel) is established between the smart TV 20 and the mobile phone 10 based on the distributed middleware, to complete the connection. It should be noted that a method of establishing the connection between the mobile phone 10 and the smart TV 20 is not limited to socket communication, but may be another method. This is not limited in this embodiment of this application.

Based on the mobile phone 10 and the smart TV 20 that are connected, the smart TV 20 locally runs the application, and sends the remote view logic information of the locally running application to the mobile phone 10.

Figure 1C:
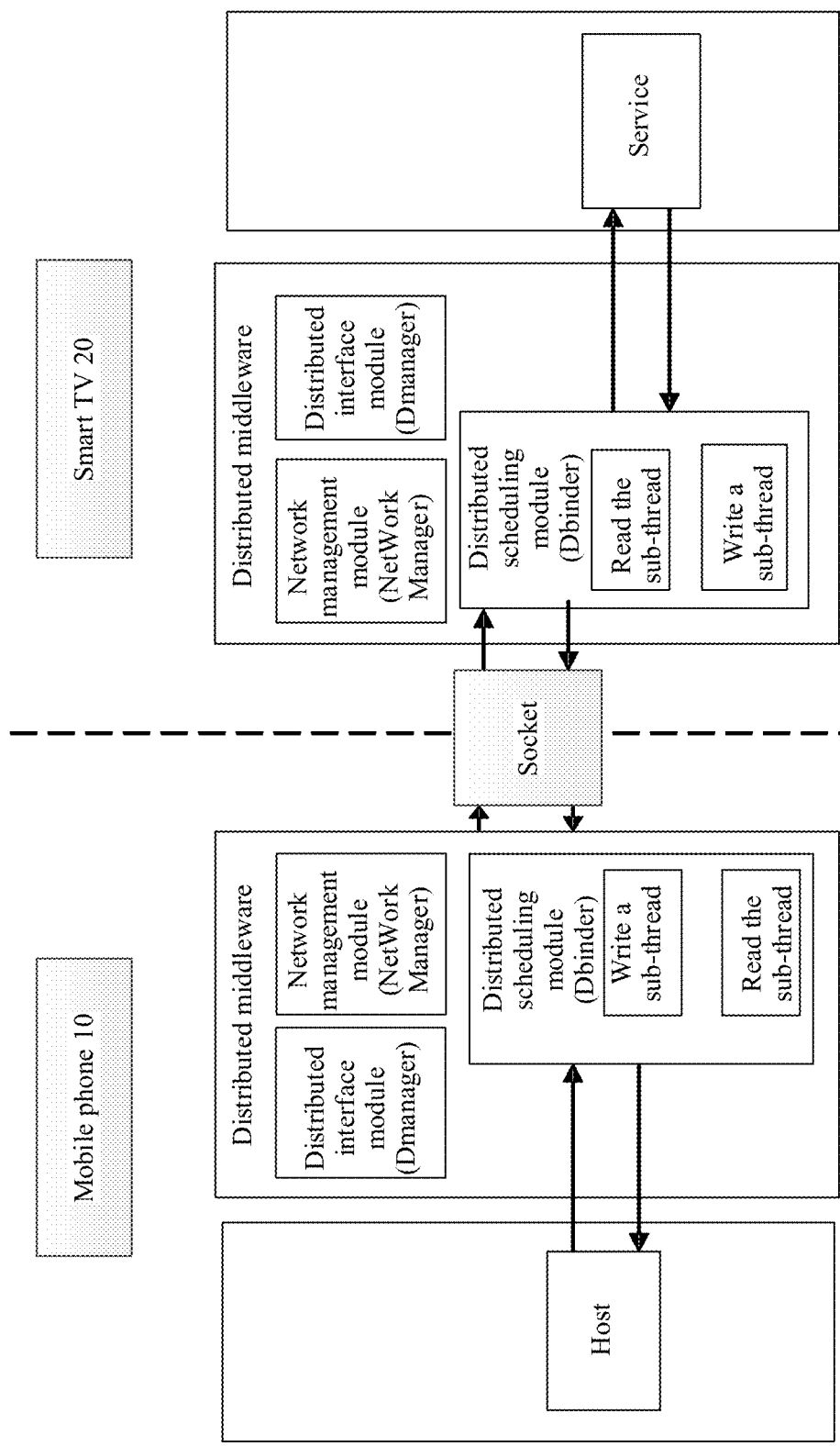
FIG. 1C is a schematic diagram of a structure of distributed middleware according to an embodiment of this application.
Figure 1D:
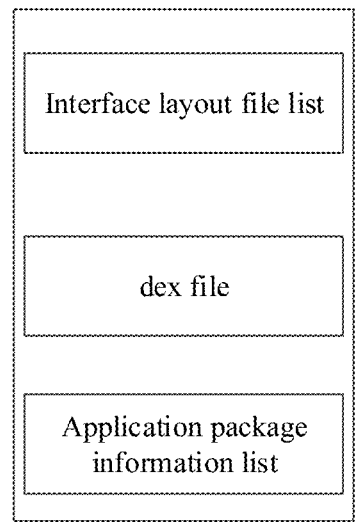
FIG. 1D is a schematic diagram of a structure of remote view logic information according to an embodiment of this application.

The remote view logic information shown in FIG. 1D includes but is not limited to the interface layout file, application package configuration information, and a dex file. The interface layout file includes an application control related to the application locally running on the smart TV 20. The application package configuration information includes a configuration parameter of an application program of the locally running application. The dex file includes a customized container control, related application logic code, and a CallBack class. It should be noted that the entire remote view logic information may be an application apk file, or may be a packaged binary file.

According to some embodiments of this application, the mobile phone 10 locally loads an interface (an interface of the application locally running on the smart TV 20) based on the remote view logic information, and binds a service of the application locally running on the smart TV 20. A process of locally loading the interface is specifically as follows: The mobile phone 10 constructs a view tree while loading the interface, and binds, in a process of constructing the view tree, the service of the application locally running on the smart TV 20.

The mobile phone 10 registers with a CallBack object after binding the service related to the locally running application.

Based on the bound service of the application locally running on the smart TV 20, the mobile phone 10 refreshes an interface on the side of the smart TV 20 while operating the locally loaded interface. The smart TV 20 reversely controls the mobile phone 10 by using ICallBack related to CallBack (which may be that the smart TV 20 reversely refreshes an interface on the side of the mobile phone 10). It should be noted that in addition to remotely refreshing the interface on the side of the mobile phone 10, the smart TV 20 may further 30) perform other control (which may be remote control) on the mobile phone 10. This is not limited in this embodiment of this application.

The smart TV 20 may alternatively operate a local partial window of the smart TV 20 by reversely refreshing an interface loaded on the side of the mobile phone 10.

According to some embodiments of this application, as shown in FIG. 1C, a structure of the distributed middleware includes but is not limited to the following modules.

A Net WorkManager network management module is configured to provide support for networking between the mobile phone 10 and the smart TV 20, authentication and key credential exchange between the mobile phone 10 and the smart TV 20, and a device connection between the mobile phone 10 and the smart TV 20.

A DManager module provides some platform interfaces for the mobile phone 10 or the smart TV 20. The platform interfaces include but are not limited to an interface used by the mobile phone 10 to bind a remote service on the side of the smart TV 20, an interface used by the mobile phone 10 to unbind the remote service on the side of the smart TV 20, an interface used by the mobile phone 10 to transfer the remote view logic information to the smart TV 20 (the interface may be an interface (a binder interface) that implements a cross-process based on a binder mechanism), and the like.

A DBinder module is packaged based on an Android binder mechanism, and can convert an original cross-process binder into a cross-device (the mobile phone 10) and the smart TV 20) binder. That the smart TV 20 invokes a binder interface of the mobile phone 10 is similar to localized binder invocation. For a host on the side of the mobile phone 10, inside a Dbinder, parameter data invoked by using a binder interface on the side of the smart TV 20 (which may be that the remote view logic information is transferred to the first electronic device in a form of a binary digital flow) is converted into a binary digital flow; and the binary digital flow is transferred to the mobile phone 10 through a data physical channel (a socket channel). To implement concurrent invoking of a plurality of binder interfaces, a thread pool and a list of a series of sub-threads may be designed in the DBinder module. A binder thread specification externally provided by the DBinder for cross-process binder invoking is consistent with a thread specification scheduled by a native platform binder.

According to some embodiments of this application, as shown in FIG. 1C, when the host on the side of the mobile phone 10 invokes a platform interface on the side of the smart TV 20, an invoked data parameter passes through the data physical channel (socket communication) twice.

According to the coordinated control method for electronic devices disclosed in this embodiment of this application, when triggering the coordinated control, the smart TV sends the remote view logic information associated with the running application to the mobile phone, and the mobile phone directly loads an application-related interface locally based on the interface layout file included in the remote view logic information. In this way, for the first electronic device end, a component, a parameter, and the like that are related to the running application of the second electronic device do not need to be customized on the first electronic device end for the running application, and only the remote view logic information transmitted to the first electronic device needs to be loaded. Distributed business logic may be defined for all running applications of the second electronic device on the side of the second electronic device, and then the second electronic device synchronizes the distributed application logic with the first electronic device. In this way, application scenarios are numerous.

As an example below; the mobile phone 10 and the smart TV 20 are the electronic devices, to describe in detail the coordinated control method for electronic devices provided in embodiments of this application.

Figure 2:
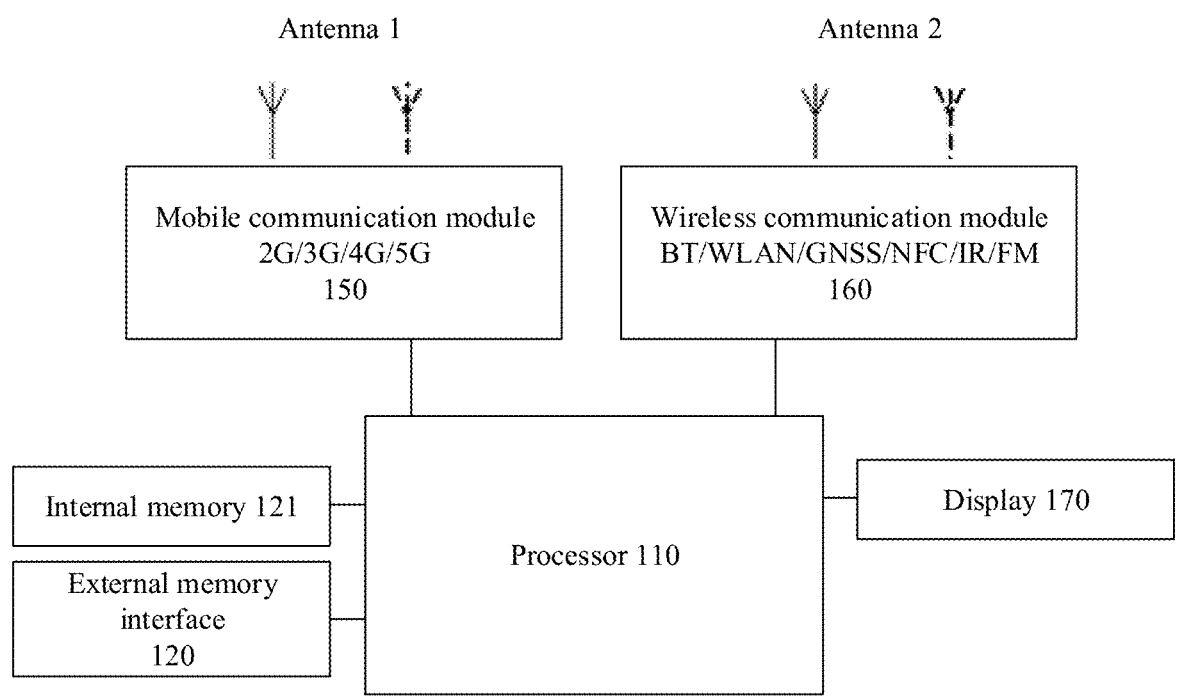
FIG. 2 is a schematic diagram of a structure of a mobile phone according to an embodiment of this application.

First, FIG. 2 is a schematic diagram of a structure of a mobile phone.

The mobile phone 10 may include a processor 110, an external memory interface 120, an internal memory 121, an antenna 1, an antenna 2, a mobile communication module 150, a wireless communication module 160, and a display 170.

It may be understood that the structure shown in this embodiment of the present invention does not constitute a specific limitation on the mobile phone 10. In some other embodiments of this application, the mobile phone 10 may include more or fewer components than those shown in the figure, or some components may be combined, or some components may be split, or there may be a different component arrangement. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent devices, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency. For this embodiment of this application, after receiving remote view logic sent by a smart TV 20, the processor 110 executes the instructions stored in the processor. Through the instructions, an application-related interface is locally loaded based on an interface layout file in the remote view logic, and a service interface that is on a side of the smart TV 20 and that is related to a locally running application is bound.

A wireless communication function of the mobile phone 10 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the mobile phone 10 may be configured to cover a single communication frequency band or a plurality of communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a solution to wireless communication such as 2G/3G/4G/5G that is applied to the mobile phone 10. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The wireless communication module 160 may provide a wireless communication solution that is applied to the mobile phone 10, and that includes a wireless local area network (WLAN) (for example, a wireless fidelity (Wi-Fi) network). Bluetooth (BT), a global navigation satellite system (GNSS), frequency modulation (FM), a near field communication (NFC) technology: an infrared (IR) technology, or the like, to implement networking with the smart TV 10. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the mobile phone 10 is coupled to the mobile communication module 150, and the antenna 2 is coupled to the wireless communication module 160, so that the mobile phone 10 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (timeTD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The mobile phone 10 implements a display function by using the GPU, the display 170, the application processor, and the like. The GPU is a microprocessor for image processing, and is connected to the display 170 and the application processor. The GPU is configured to: perform mathematical and geometric calculation, and render an image. The processor 110 may include one or more GPUs that execute program instructions to generate or change display information.

The display 170 is configured to display an interface that is included in the remote view logic information and that is related to a application run by the smart TV 10. The display 170 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the mobile phone 10 may include one or N displays 170, and N is a positive integer greater than 1.

The external memory interface 120 may be configured to connect to an external storage card, for example, a micro SD card, to extend a storage capability of the mobile phone 10. The external storage card communicates with the processor 110 through the external memory interface 120, to implement a data storage function. For example, the remote view logic information transferred by the smart TV 20 is stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) and the like created during use of the mobile phone 10. In addition, the internal memory 121 may include a high-speed random access memory, and may further include a nonvolatile memory, for example, at least one magnetic disk storage device, a flash memory, or a universal flash storage (UFS). The processor 110 runs instructions stored in the internal memory 121 and/or instructions stored in the memory disposed in the processor, to perform various function applications and data processing of the mobile phone 10.

Figure 3:
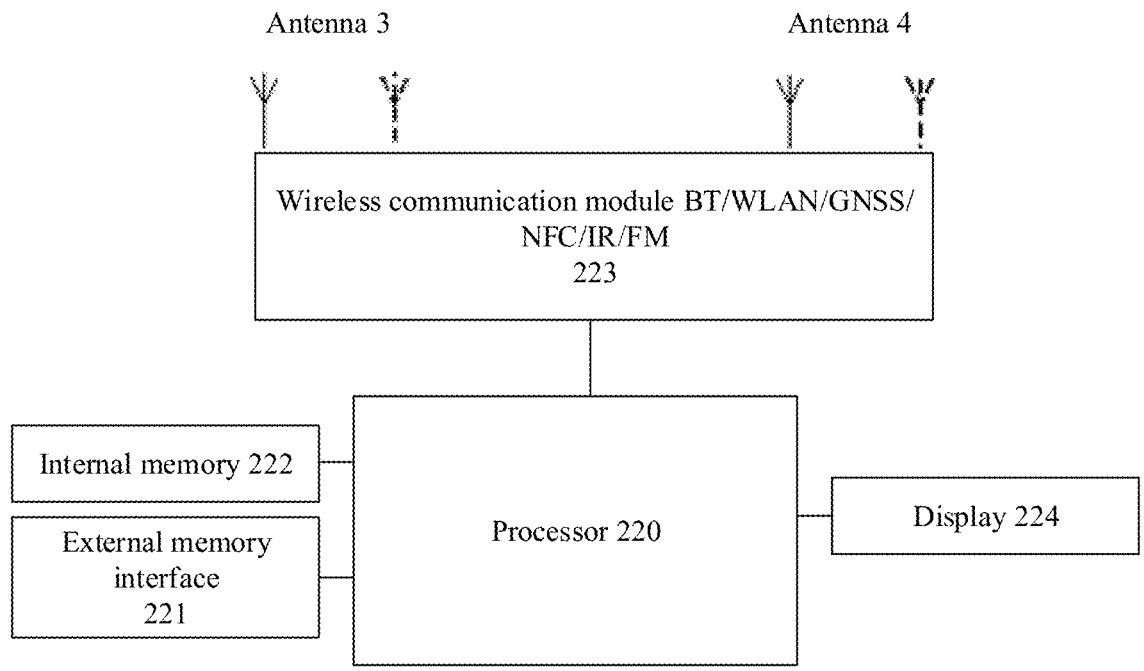
FIG. 3 is a schematic diagram of a structure of a smart TV according to an embodiment of this application.

FIG. 3 is a schematic diagram of a structure of a smart TV according to an embodiment of this application.

A smart TV 20 may include a processor 220, an external memory interface 221, an internal memory 222, an antenna 3, an antenna 4, a wireless communication module 223, a display 224, and the like.

It may be understood that the structure shown in this embodiment of the present invention does not constitute a specific limitation on the smart TV 20. In some other embodiments of this application, the smart TV 20 may include more or fewer components than those shown in the figure, or some components may be combined, or some components may be split, or there may be a different component arrangement. The components shown in the figure may be implemented by using hardware, software, or a combination of software and hardware.

For detailed descriptions of the processor 220, the external memory interface 221, the internal memory 222, the antenna 3, the antenna 4, the wireless communication module 223, the display 224, and the like of the smart TV 20, correspondingly refer to descriptions of the mobile phone 10. Details are not described in this embodiment of this application. The external memory interface 221 may be configured to connect to an external storage card such as a micro SD card, to extend a storage capability of the smart TV 20. The external storage card communicates with the processor 220 through the external memory interface 221, to implement a data storage function. For example, a cache file generated by a locally running application is stored in the external storage card.

The internal memory 222 may be configured to store computer-executable program code. The executable program code includes instructions. The internal memory 222 may include a program storage area and a data storage area. The program storage area may store an operating system. The data storage area may store data (such as audio data and a video) and the like created during use of the smart TV 20. In addition, the internal memory 222 may include a high-speed random access memory, and may further include a nonvolatile memory, for example, at least one magnetic disk storage device, a flash memory, or a universal flash storage (UFS). The processor 220 runs instructions stored in the internal memory 222 and/or instructions stored in the memory disposed in the processor, to perform various function applications and data processing of the smart TV 20.

Technical solutions of embodiments of this application are described below with reference to specific scenarios.

Scenario 1:

In scenario 1, for example, electronic devices are a mobile phone 10 and a smart TV 20. In scenario 1, a locally running application of an application host on a side of the smart TV 20 is a text edition application (which may be used as a specific application). A processor 220) on the side of the smart TV 20 displays a text edition interface on a local display 224 based on the text edition application. The processor 220 on the side of the smart TV 20 triggers coordinated control, and broadcasts a device connection request. The mobile phone 10 establishes a communication connection to the smart TV 20 based on the device connection request and binds a service that is in the smart TV 20 and that is related to the text edition application. The smart TV 20 sends remote view logic information that includes the text edition interface to the mobile phone 10 through an established communication channel. A processor 110 of the mobile phone 10 locally loads a local window (the text edition interface of the smart TV) of the text edition application of the application host on the side of the smart TV 20 based 30) on the remote view logic information. The processor of the mobile phone 10 controls a display 170 to display an interface of the text edition application. In addition, when entering text in the local text edition interface, the mobile phone 10 synchronizes the entered text with the text edition interface on the side of the smart TV 20 in real time by using a bound service related to the text edition application. It should be noted that another type of application may run on the side of the smart TV 20. This embodiment of this application is not limited to the text edition application. In addition, the mobile phone 10 may also perform another operation on the loaded local text edition interface. This embodiment of this application is not limited to an operation of entering text.

Figure 4A:
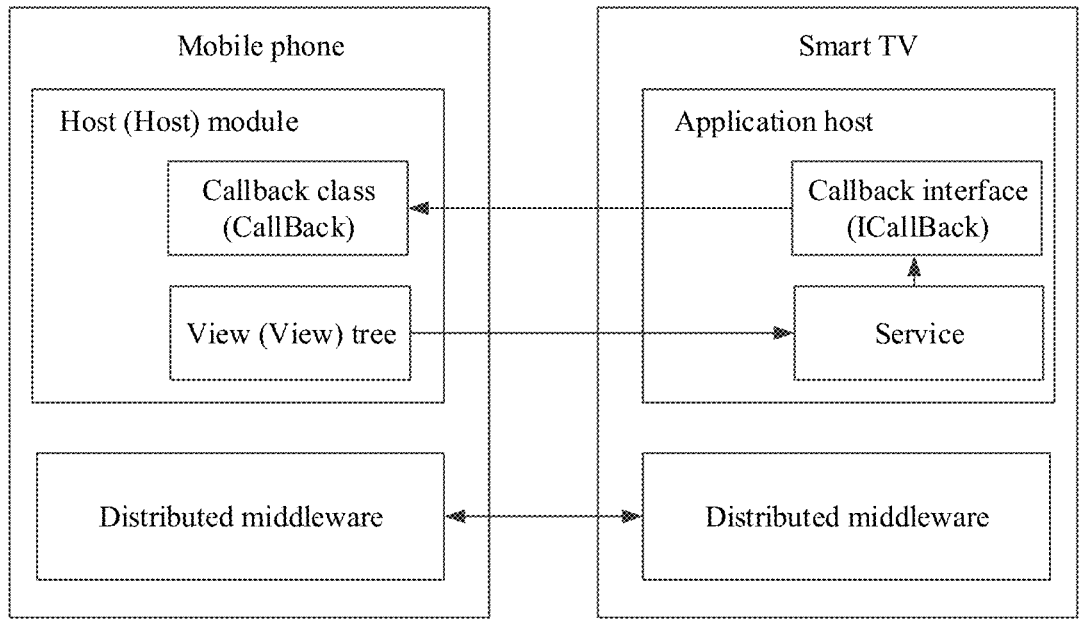
FIG. 4A is a diagram 1 of a scenario of coordinated control of a mobile phone and a smart TV according to an embodiment of this application.
Figure 4B:
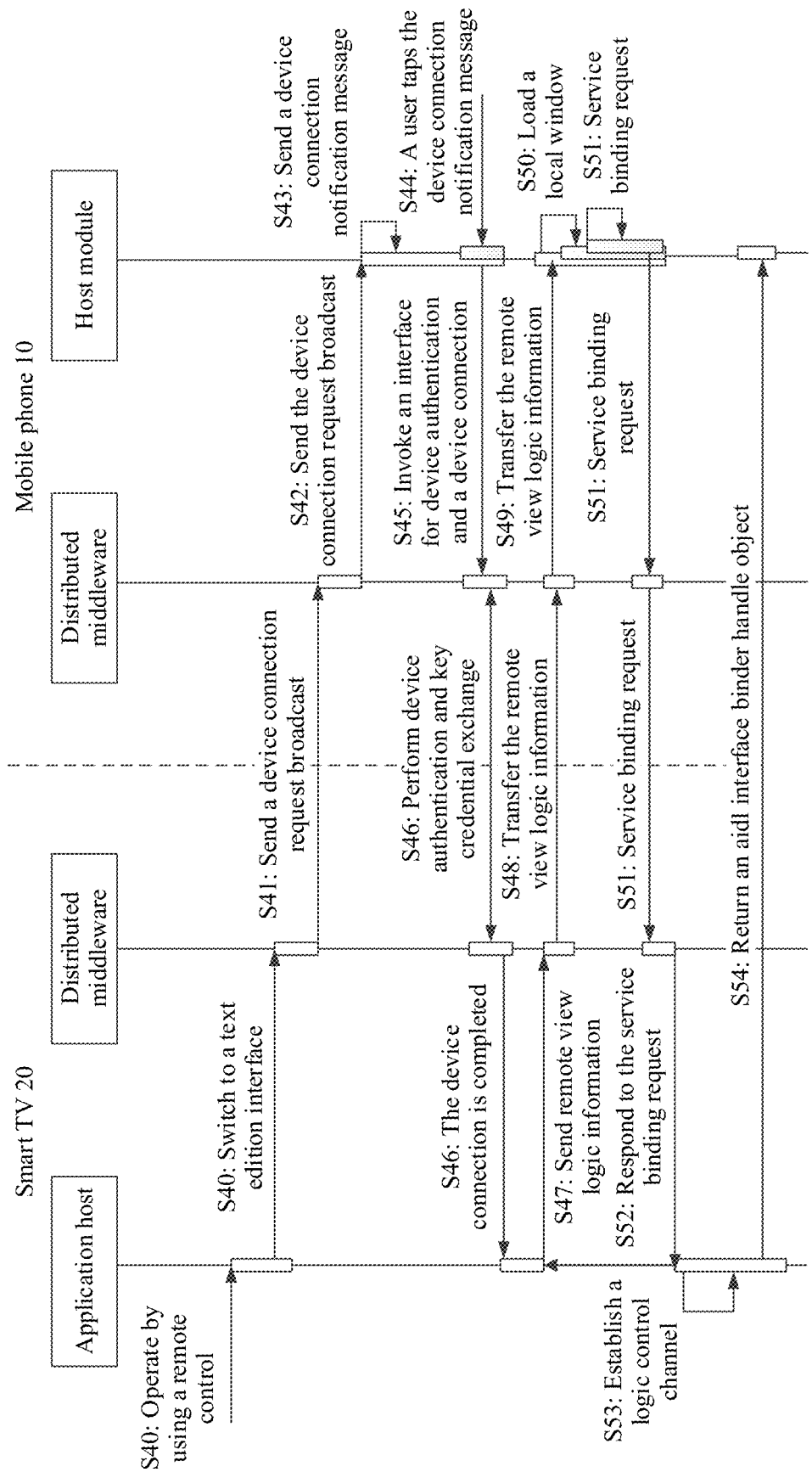
FIG. 4B is a flowchart of a coordinated control method for a mobile phone and a smart TV according to an embodiment of this application.
Figure 4C:
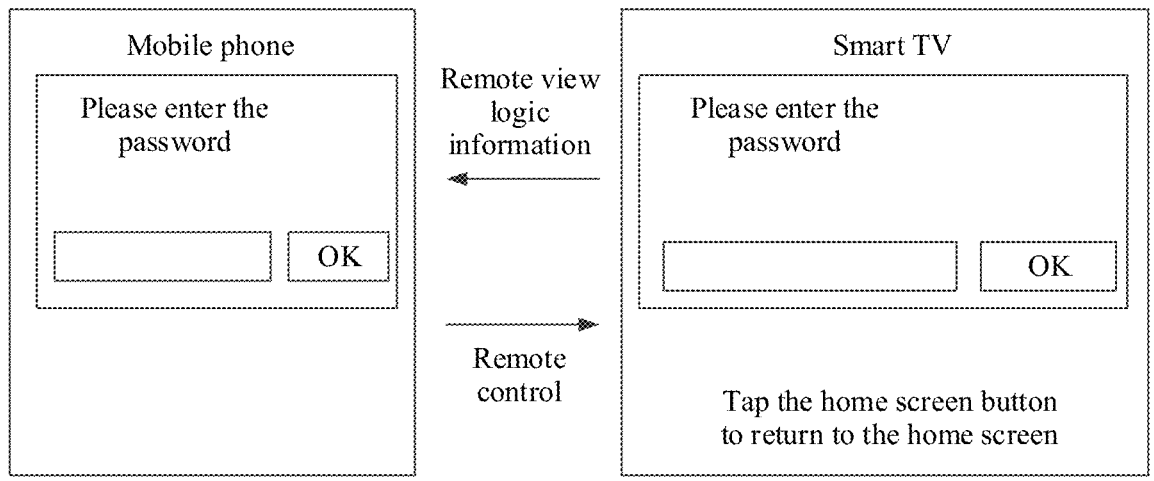
FIG. 4C is a schematic diagram of an interface of a password entering application according to an embodiment of this application.

Refer to FIG. 4A. FIG. 4B, and FIG. 4C. FIG. 4A is a diagram 1 of a scenario of coordinated control of a mobile phone and a smart TV according to an embodiment of this application. FIG. 4B is a flowchart of a coordinated control method for a mobile phone and a smart TV according to an embodiment of this application. FIG. 4C is a schematic diagram of an interface of a password entering application according to an embodiment of this application. The coordinated control method for the mobile phone and the smart TV in this embodiment of this application is described in detail below with reference to FIG. 4A. FIG. 4B, and FIG. 4C.

As shown in FIG. 4A, a smart TV end 20 includes but is not limited to an application host and distributed middleware. The application host includes but is not limited to a text edition interface control, a service component, and an ICallBack object. A mobile phone end 10 includes but is not limited to a host module and distributed middleware. The host module includes but is not limited to a CallBack object. The ICallBack object and the CallBack object are in a relationship of a host and a server. The smart TV 20 may reversely refresh a text edition interface of a locally running application of the mobile phone 10 by using the ICallBack object. Networking of the smart TV 20 and the mobile phone 10, a connection between the mobile 20) phone 10 and the smart TV 20, trusted authentication between the mobile phone 10 and the smart TV 20, data transfer between the mobile phone 10 and the smart TV 20, and a capability of invoking a binder interface between the mobile phone 10 and the smart TV 20 are implemented by using the distributed middleware.

According to some embodiments of this application, when a user on the smart TV end 20 switches to a text edition application, a side of the smart TV 20 sends a device connection request broadcast to the mobile phone 10 in a same local area network by using the distributed middleware on the side of the smart TV 20. After a side of the mobile phone 10 receives the device connection request broadcast, the distributed middleware on the side of the mobile phone 10 sends a message to the host module of the mobile phone 10. The host module 30) (which is an application module for receiving and loading remote view logic information) sends a device connection notification message to the smart TV 20 based on the device connection request broadcast by using the distributed middleware. The host module of the mobile phone 10 invokes a platform interface (which can provide a binder handle object as a binder interface) provided by the distributed middleware of the mobile phone 10, to connect to the smart TV 20 (a socket physical channel may be created by using a socket). The smart TV 20 sends the remote view logic information based on a socket physical channel provided by the distributed middleware. The host module of the mobile phone 10 locally loads the text edition interface on the side of the smart TV 20 based on the remote view logic information, registers with the CallBack object, and binds the service component (with a remote service function) of the smart TV 20 in a process of loading a view tree. The mobile phone 10 synchronizes control information (refresh data of a locally loaded text edition application (such as text entered by the user in the text edition interface)) with the text edition interface of the smart TV 20 by using a service interface. In addition, the smart TV 20 may further reversely synchronize text or other information with the mobile phone 10 by using the ICallBack object.

As shown in FIG. 4B, the coordinated control method for the mobile phone and the smart TV includes the following steps.

Step S40: When operating the application host of the smart TV 20 by using a remote control, the user on the side of the smart TV 20 switches the smart TV 20 to the text edition application, and displays a text edition interface on a display of the smart TV 20.

Step S41: The distributed middleware on the side of the smart TV 20 sends a device connection request broadcast. A device connection request sent by the smart TV 20 is in a local area network in which the smart TV 20 is located, and when the mobile phone 10 and the smart TV 20 are in a same local area network, the device connection request broadcast sent by the 20) smart TV may be received.

Step S42: The distributed middleware on the side of the mobile phone 10 receives the device connection request broadcast sent by the distributed middleware of the smart TV 20, and the distributed middleware on the side of the mobile phone 10 sends the device connection request broadcast to the host module on the side of the mobile phone 10.

Step S43: The host module on the side of the mobile phone 10 sends a device connection notification message based on the device connection request broadcast.

Step S44: The user taps the device connection notification message (triggers a touch instruction) on a display 170 of the mobile phone 10.

Step S45: A processor of the mobile phone 10 controls, based on the touch instruction, the host module of the mobile phone 10 to invoke an interface that is for device authentication and a device connection and that is of the distributed middleware on the side of the mobile phone 10.

Step S46: The distributed middleware of the mobile phone 10 performs device authentication and key credential exchange on the smart TV 20, and then implements a device connection to the smart TV 20 by using the connection interface of the distributed middleware.

According to some embodiments of this application, in a process of establishing a device connection on the side of the mobile phone 10, the mobile phone 10 and the smart TV 20 each transfer a service list with a remote invoking capability to a peer end. A process in which the mobile phone 10 and the smart TV 20 transmit the service list includes two steps: Step 1 is that the mobile phone 10 or the smart TV 20 queries a service list with a remote capability by using an Android packet manager service interface. Step 2 is that the mobile phone 10 or the smart TV 20 transmits the remote service list to a peer end by using an interface provided by the distributed middleware. In this way, when the smart TV 20 runs an application and the mobile phone 10 needs to bind a service of the smart TV 20, the mobile phone 10 first queries, from a memory of the mobile phone 10, whether the service list with the remote invoking capability that is transmitted by the smart TV 20 is served by a remote end, and then binds the service on the side of the smart TV 20 by using the distributed middleware on the side of the mobile phone 10.

Step S47: After the smart TV 20 and the mobile phone 10 are connected, the smart TV 20 sends remote view logic information to the distributed middleware on the side of the smart TV 20.

According to some embodiments of this application, the remote view logic information is an application structure, and is packaged into an implementation of an apk compressed package by using an Android system apk packaging tool aapt. The compressed package includes three files: an application package configuration information file (such as an application package for editing text), an interface layout file (a text edition interface), and a dex file. The dex file includes a customized container control and a CallBack class. In addition, the remote view logic information may alternatively be generated after being packaged by using another tool. This is not limited in this embodiment of this application.

The interface layout file in the remote view logic information is customized by the application host on the side of the smart TV 20, and is a part of an edition window layout of the smart TV 20. Optionally, for a text edition application, the interface layout file in the remote view logic information may include a text input control EditText. or may include two controls: a text input control EditText and a text prompt control TextView: The interface layout file may alternatively use a container control of an extended standard template of an Android system. A specific type selected for the container control is defined by a business based on a requirement. A window interface on the side of the mobile phone 10 and a window interface on the side of the smart TV 20 are bound with a same service related to the text edition application. Synchronization of a window layout file control status (such as a change in a shape of the text input control EditText) and information (such as text entered in the text input control) on the side of the mobile phone 10 and the side of the smart TV 20 may be implemented by using a service interface externally disclosed by the bound service. In addition, the interface layout file in the remote view logic information may further include another control. A type of the control is not limited in this embodiment of this application.

According to some embodiments of this application, the text edition application on the side of the smart TV 20 is a password entering application. As shown in FIG. 4C, after the text input control EditText (a password entering text edition box) is displayed on a display 224, the side of the smart TV 20 sends the remote view logic information to the mobile phone 10. The side of the mobile phone 10 locally loads, based on the remote view logic information, the password entering text edition box that adapts to the smart TV 20. When locally refreshing the password entering text edition box or enters text in the password entering text edition box, the mobile phone 10 synchronizes a refresh interface with the side of the smart TV 20 in real time.

It can be learned based on FIG. 4C that when running the password entering Kibbitz, the side of the smart TV 20 displays the text prompt control TextView "Please enter the password", the password entering text edition box, a control "OK", and a text prompt control "Tap the home screen button to return to the home screen" on an interface. It may be understood that other more controls may be further customized on the interface displayed on the side of the smart TV 20. This is not limited in this embodiment of this application.

According to some embodiments of this application, related definitions such as width and height of the text prompt control, the password entering text edition box, the confirm control, and the like may be defined by using parameters of a linear layout.

For example. CustomView is a customized control class name, and is a container control, and includes a text prompt control, a text edition box, and a button. A customized control defines width and height of the container control, and is consistent with a parent container.

For the text prompt control TextView "Please enter the password", three fields are ID, width, and height.

A linear layout container is defined under the text prompt control. The container control includes but is not limited to a text edition box and a control "OK".

The password entering text edition box is defined as follows: Four fields are ID, width, height, and type of entered text.

The control "OK" is defined as follows: Four fields are ID, width, height, right alignment manner, and display a text definition.

Certainly, the password entering application or another application may alternatively have other more definitions. This is not limited in this embodiment of this application.

It may be understood that other more controls may be further customized on the interface displayed on the side of the smart TV 20, and another definition manner may be used. This is not limited in this embodiment of this application.

In this embodiment of this application, the interface layout file in the remote view logic information transferred by the smart TV 20 includes a view tree. The view tree may be used as a part of the text edition interface on the side of the smart TV 20, and the interface layout file may also be independently defined by a application based on application logic. This is not limited in this embodiment of this application. The interface layout file may include the text input control EditText, or may include some other controls, to implement diversity of remote interface coordination. Optionally, for ease of development, a layout of the remote view logic information may use some container controls with a remote control capability based on an extended definition of the Android system. In addition, a structure of the remote view logic information has remote access invoking logic information. While loading the remote view logic information, the side of the mobile phone 10 binds a remote service on the side of the smart TV 20. Through the remote service, control information can be transferred between the mobile phone 10 and the smart TV 20. In this way, a controlled interface invoking method is used between the mobile phone 10 and the smart TV 20, so that a delay is small, and coordination experience between the mobile phone 10 and the smart TV 20 is good.

Step S48: In response to the remote view logic information, the distributed middleware on the side of the smart TV 20 sends the remote view logic information (the interface layout file in the remote view logic information includes the text prompt control TextView "Please enter the password", the password entering text edition box, and the control "OK") on the side of the smart TV 20 to the distributed middleware on the side of the mobile phone 10.

Step S49: After receiving the remote view logic information, the distributed 30) middleware on the side of the mobile phone 10 transfers the remote view logic information to the host module on the side of the mobile phone 10.

Step S50: The host module on the side of the mobile phone 10 loads the interface layout file based on the remote view logic information, and generates a local window in a process of loading the interface layout file. A view tree is constructed in the local window; and the view tree includes the text prompt control TextView "Please enter the password", the password entering text edition box, and the control "OK", so that an interface related to the text input application is locally displayed on the side of the mobile phone 10.

Step S51: The side of the mobile phone 10 loads the view tree in a process of loading the local window; the host module on the side of the mobile phone 10 requests, based on the loaded view tree, to bind the service with the remote invoking capability on the side of the smart TV 20, and the mobile phone 10 sends a service binding request to the distributed middleware on the side of the smart TV 20 by using the distributed middleware on the side of the mobile phone 10.

Step S52: The distributed middleware on the side of the smart TV 20 sends the service binding request of the distributed middleware on the side of the mobile phone 10 to the application host of the smart TV 20. In response to the service binding request, the application host binds a service related to the text input application.

Step S53: After the service is bound on the side of the smart TV 20, the mobile phone loads the view tree to bind the service of the smart TV 20 and registers with a CallBack service object.

Step S54: The mobile phone 10 obtains an aidl interface binder handle object (a binder interface) returned by the application host on the side of the smart TV 20, so that the mobile phone 10 may transfer a control message to the smart TV 20 by using the binder handle object, and the mobile phone 10 assists the smart TV 20 in entering text. In addition, the smart TV 20 may further reversely control the mobile phone 10 (for example, refresh an interface of the mobile phone 10) by using the ICallBack.

In the technical solution in scenario 1, while loading the remote view logic information, the side of the mobile phone 10 binds the remote service on the side of the smart TV 20. Through the remote service, control information can be transferred between the mobile phone 10 and the smart TV 20. In this way, a controlled interface invoking method is used between the mobile phone 10 and the smart TV 20, so that a delay is small, and the coordination experience between the mobile phone 10 and the smart TV 20 is good.

A layout on the interface on the side of the smart TV 20 may be customized by the side of the smart TV 20. After being locally constructed, the layout customized by the side of the smart TV 20 is sent to the mobile phone 10 in a form of the remote view logic information. The mobile phone 10 only needs to load the remote view logic information to locally load the interface. There is no need to customize, on the side of the mobile phone for the text input application of the smart TV, a component and a parameter that are related to the text input application, and only the remote view logic information transmitted by the smart TV needs to be loaded. Distributed application logic can be defined for all running applications of the smart TV on the side of the smart TV, and then the smart TV synchronizes the distributed application logic with the mobile phone. In this way, application scenarios are numerous.

The ICallBack object on the side of the smart TV 20 and the CallBack object on the side of the mobile phone are in a relationship of a host and a server. The smart TV 20 may reversely refresh, by using the ICallBack object, a text edition interface or other information of a locally running application of the mobile phone 10.

Scenario 2:

In scenario 2, for example, the electronic devices are a mobile phone 10 and a smart TV 20. In scenario 2, a locally running application of an application host on a side of the smart TV 20 is a ball game. A processor 220 on the side of the smart TV 20 displays a ball game interface on a local display 224 based on the ball game. The processor 220 on the side of the smart TV 20 triggers coordinated control, and broadcasts a device connection request by using distributed middleware, and the mobile phone 10 receives the device connection request by using distributed middleware of the mobile phone 10, and establishes a communication connection to the smart TV 20 based on the device connection request. The smart TV 20 sends remote view logic information that includes the ball game to the mobile phone 10 through an established communication channel. A processor 110 of the mobile phone 10 locally loads, based on the remote view logic information, a local window (the ball game interface on the side of the smart TV 20) related to the ball game of the application host on the side of the smart TV 20. It should be noted that scenario 2 may alternatively be a technical solution in which two mobile phones 10 implements scenario 2, and a type of the electronic device is not limited in this embodiment of this application.

The processor of the mobile phone 10 controls a display 170 to display the ball game interface. When operating a game slider control on the local ball game interface, the mobile phone 10 synchronously refreshes, in real time, a status of the game slider control and a current game interface of the ball game to the ball game interface on the side of the smart TV 20 by using a bound service related to the ball game. When operating the local game interface on the side of the smart TV 20, the side of the smart TV 20 reversely synchronizes a game refresh interface on the side of the smart TV 20 with the side of the mobile phone 10. It should be noted that another type of application may run on the side of the smart TV 20. This embodiment of this application is not limited to the ball game application.

Figure 5A:
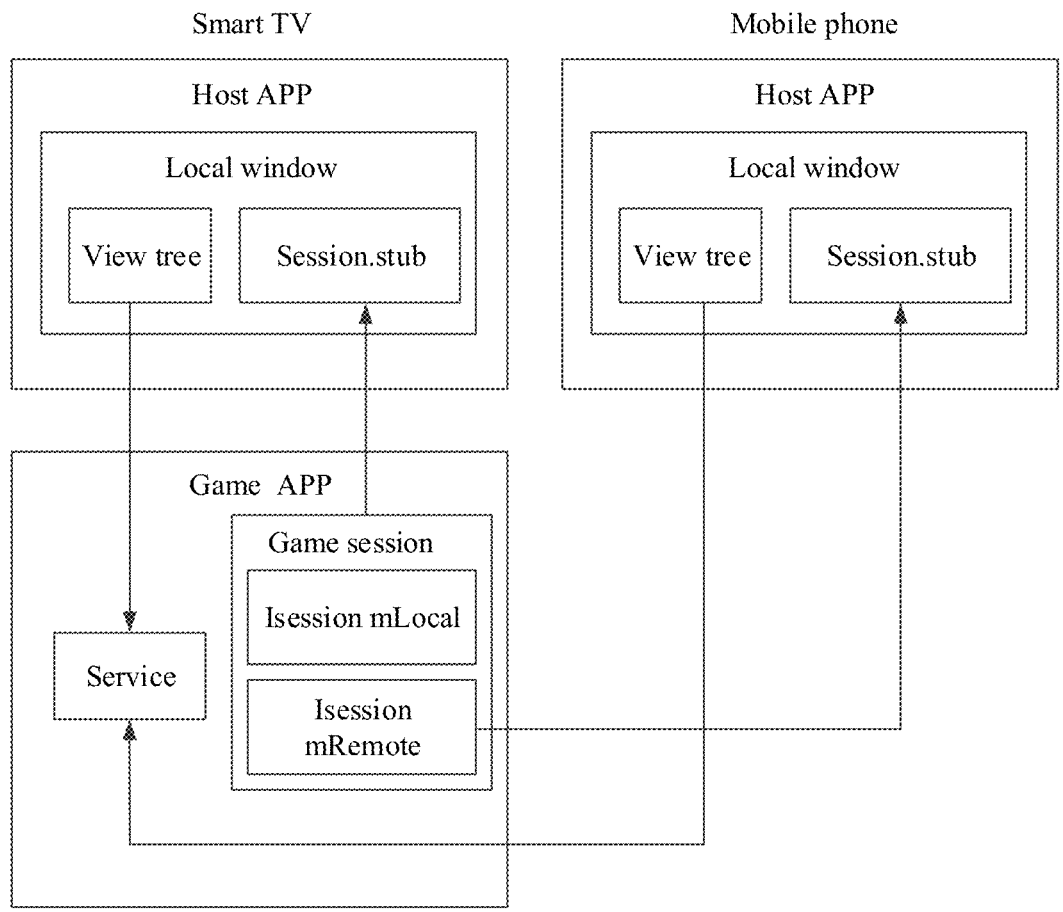
FIG. 5A is a diagram 2 of a scenario of coordinated control of a mobile phone and a smart TV according to an embodiment of this application.
Figure 5B:
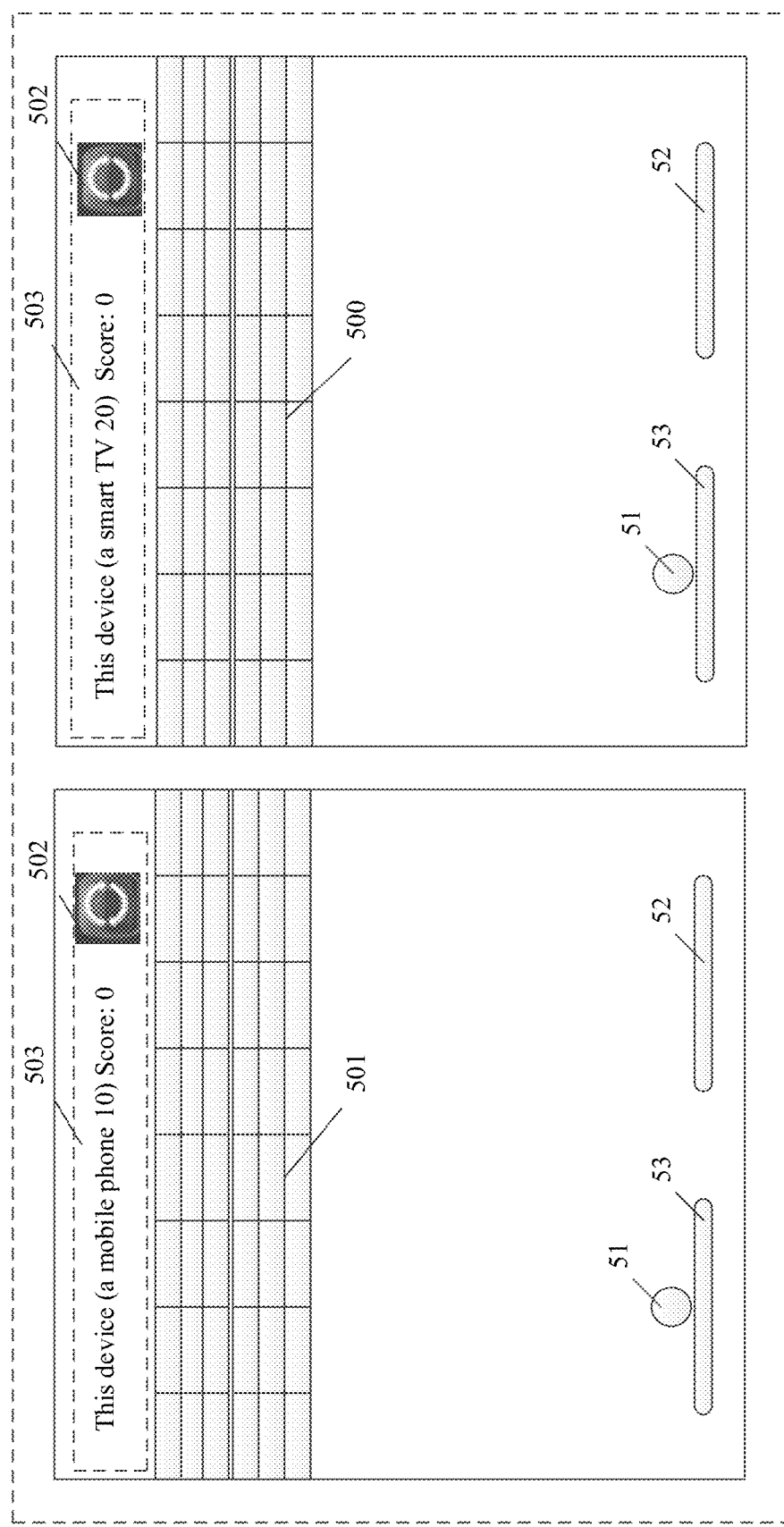
FIG. 5B is a schematic diagram of an interface of a ball game according to an embodiment of this application.
Figure 5C:
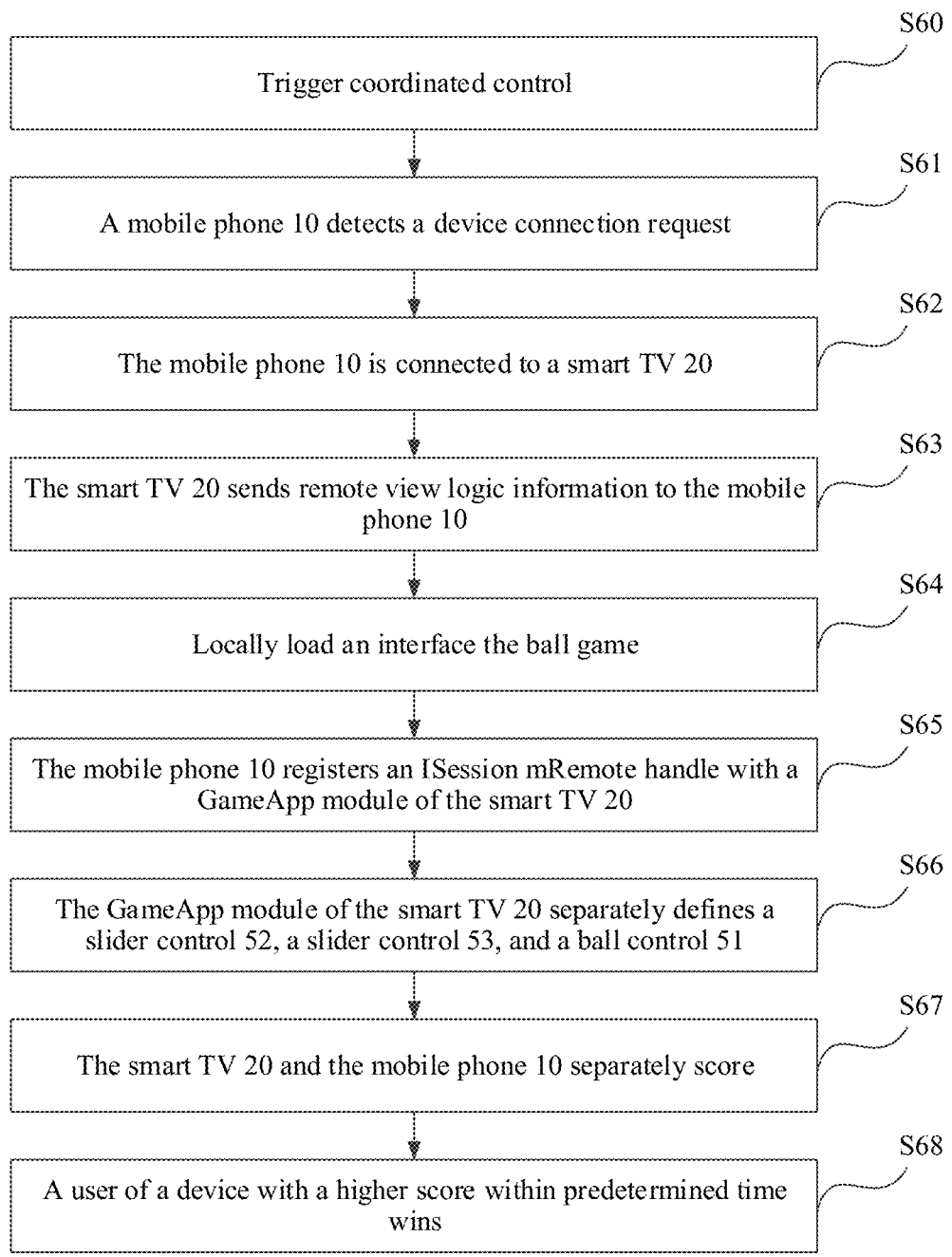
FIG. 5C is a schematic flowchart of a coordinated control method for a mobile phone and a smart TV according to an embodiment of this application.

Refer to FIG. 5A. FIG. 5B, and FIG. 5C. FIG. 5A is a diagram 2 of a scenario of coordinated control of a mobile phone and a smart TV according to an embodiment of this application. FIG. 5B is a schematic diagram of an interface of a ball game according to an embodiment of this application. FIG. 5C is a schematic flowchart of a coordinated control method for a mobile phone and a smart TV according to an embodiment of this application. The coordinated control method for the mobile phone and the smart TV in this embodiment of this application is described in detail below with reference to FIG. 5A. FIG. 5B, and FIG. 5C.

As shown in FIG. 5A and FIG. 5B, a host APP of the smart TV 20 and a host APP of the mobile phone 10 are used to display a ball game interface, and the host APP includes a view tree and a Session.stub server. For the ball game in scenario 2 of this application, view 10) trees on a side of the smart TV 20 and the mobile phone 10 include but are not limited to a grid block container control 500 and a grid block container control 501 (6×8 sub-grid blocks are arranged based on rows and columns), a ball control 51, and a slider control 52 on the side of the smart TV 20 or a slider control 53 on a side of the mobile phone 10. A button control 502 and a scoring control 503 are reset. The slider control 52 and the slider control 53 are respectively manipulation controls on the side of the smart TV 20 and the side of the mobile phone 10. Both the slider control 52 and the slider control 53 may respond to an input event, and the input event may be a sensor event or a TP event. The sensor event is three-dimensional coordinate information uploaded by a pressure sensor, a gyroscope, and the like of the smart TV 20 and the mobile phone 10. The TP event is a screen touch event in which a user touches the smart TV 20 and the mobile phone 10.

According to some embodiments of this application, the side of the smart TV 20 and the side of the mobile phone 10 may control a position of the ball control 51 by using the slider control 52. The game interface on the side of the smart TV 20 may be synchronized with the side of the mobile phone 10, and the game interface on the side of the mobile phone 10 may be synchronized with the side of the smart TV 20.

When the ball control 51 touches a sub-grid block in the grid block container control 500 or a sub-grid block in the grid block container control 501 on respective interfaces, the sub-grid block that is in the grid block container control 500 or the sub-grid block that is in the grid block container control 501 and that is touched by the ball control 51 disappears, and victory or defeat of the ball game is determined (which may be: if the sub-grid block that is in the grid block container control 500 and that is touched by the ball control 51 correspondingly disappears or the sub-grid block that is in the grid block container control 501 and that is touched by the ball control 51 correspondingly disappears, a scoring control on a corresponding game interface gets a few points: or may be: if the ball control collides with the sub-grid block in the grid block container control 500 or the sub-grid block in the grid block container control 501 once. 1 point is got, and a score is increased in sequence). If a specific score (which may be customized) is not reached on the side of the mobile phone 10 and the side of the smart TV 20 within specified time, the ball game is invalid.

The slider control 52 of the ball game is to be operated by the smart TV 20, and the slider control 53 is to be operated by the mobile phone 10. To be specific, the smart TV 20 and the mobile phone 10 may affect positions of the slider control 52 and the slider control 53 based on the TP event or the sensor input event. When the ball control 51 or a ball control 54 falls to the bottom of respective windows, the ball control 51 or the ball control 54 collides with the respective slider control 52 or slider control 53, and the ball control 51 bounces back after collision. A bounce path is related to a speed and a collision position and angle.

A game process of the ball game is specifically as follows: The smart TV 20 and the mobile phone 10 respectively control the respective slider control 52 and slider control 53; if the slider control 52 collides with the ball control 51 so that the ball control 51 is in contact with the sub-grid block in the grid block container control 500 in the game interface of the smart TV 20, the smart TV 20 scores; and if the slider control 53 collides with the ball control 51 so that the ball control 51 collides with the sub-grid block in the grid block container control 501, the mobile phone 10 scores. A party with a higher score within specified time wins. Optionally, a host APP and a game APP of the ball game may be implemented by a same application process.

It should be noted that users of the two devices: the smart TV 20 and the mobile phone 10, respectively operate the slider control 52 and the slider control 53 that belong to the users, and cannot operate a slider control of the other party. For example, when the user of the smart TV 20 operates the slider control 52 and the slider control 52 collides with the ball control 51, the ball control 51 bounces back, and when the ball control 51 collides with the grid block container control 500, the ball game scores for the user of the smart TV 20 and displays a score in the scoring control. When the user of the mobile phone 10 operates the slider control 53 and the slider control 53 collides with the ball control 51, the ball control 51 bounces back, and when the ball control 51 collides with the grid block container control 501, the ball game scores 30) for the user of the mobile phone 10. A user of a device with a higher score within specific time wins.

As shown in FIG. 5A, the Session.stub server included in the host APP of the smart TV 20 is bound to a service (which may be a session service) in the game APP (an application of the ball game) on the side of the smart TV 20 in a process of constructing a view tree on the side of the smart TV 20, and transfers an ISession mLocal handle in the session service to the game APP by using an aidl interface provided externally by the service. In this way, the game APP controls to update the interface of the ball game on the side of the smart TV 20 by using an ISession mLocal handle object.

The side of the smart TV 20 further includes a game APP. The game APP is responsible for managing application logic management of the ball game. The game APP includes a service component and a GameSession module. The GameSession module manages an Isession mLocal handle and an Isession mRemote handle. A session mLocal handle is used to refresh the ball game interface of the host APP of the smart TV 20, and the Isession mRemote handle is used to refresh the ball game interface of the host APP of the mobile phone 10.

The side of the mobile phone 10 includes a host APP and a Session.stub server. After the communication connection is established between the smart TV 20 and the mobile phone 10, the mobile phone 10 receives the remote view logic information (an interface control of the ball game) transferred by the smart TV 20, locally loads an interface of the ball game, and displays the interface on the host APP. In addition, the mobile phone 10 binds a service of the game APP in the smart TV 20, and after binding the service, registers with an ISession mRemote handle in the game APP by using a service interface externally disclosed by the service. In this way, the smart TV 20 may update the ball game interface on the side of the mobile phone 10 by using the ISession mRemote handle in the game APP.

A local window on the side of the mobile phone 10 also displays a same ball game interface as that of the smart TV 20.

As shown in FIG. 5C, a procedure of controlling the ball game by using the mobile phone 10 and the smart TV 20 is specifically as follows:

Step S60: The smart TV 20 enters the host APP to start the ball game, selects a distributed game mode for the ball game, triggers coordinated control, and broadcasts a device connection request in a communication network in which the smart TV 20 is located.

According to some embodiments of this application, a manner in which the smart TV 20 broadcasts the device connection request includes but is not limited to: broadcasting the device connection request by using a NetWorkManager network management module of distributed middleware.

According to some embodiments of this application, after starting the ball game, the smart TV 20 registers with a session mLocal handle in a GameApp module to refresh the ball game interface of the host APP of the smart TV 20.

Step S61: The mobile phone 10 detects the device connection request. After detecting the device connection request, the mobile phone 10 displays, on a display of the mobile phone 10, information related to a device connection, so that the user performs an operation to connect to the smart TV 20.

Step S62: The user operates the mobile phone 10 to trigger to connect the mobile phone 10 and the smart TV 20.

Specifically, the mobile phone 10 receives the device connection request by using distributed middleware of the mobile phone 10, establishes a communication connection (which may be a socket connection) to the smart TV 20 based on the device connection request, binds a service that is in the smart TV 20 and that is related to the ball game, and registers with a service handle.

Step S63: After the mobile phone 10 and the smart TV 20 are connected, the smart TV 20 sends remote view logic information (a game interface of the ball game on the side of the smart TV 20) to the mobile phone 10.

Step S64: A HostApp module of the mobile phone 10 receives the remote view logic information, and locally loads an interface of the ball game. In addition, the HostApp module of the mobile phone 10 binds a service component in the GameApp module of the smart TV 20.

Step S65: The mobile phone 10 registers an ISession mRemote handle with the GameApp module of the smart TV 20.

Step S66: The GameApp module of the smart TV 20 separately defines the slider control 52, the slider control 53, and the ball control 51. The slider control 52 and the ball control 51 correspond to a HostApp module of the smart TV 20, and the slider control 53 and the ball control 51 correspond to the HostApp module of the mobile phone 10.

Step S67: The smart TV 20 and the mobile phone 10 score. When the smart TV 20 operates the slider control 52, the ball control 51 is triggered to collide with the grid block container control 500, and the GameApp module scores for the smart TV 20, and displays a score on a scoring control 503 on a game interface of the smart TV 20. When the mobile phone 10 operates the slider control 53, the ball control 51 is triggered to collide with the grid block container control 501, and the GameApp module scores for the mobile phone 10, and displays a score on a scoring control 503 on a game interface of the mobile phone 10.

According to some embodiments of this application, there is a reset exit button 502 on both the game interfaces of the smart TV 20 and the mobile phone 10. When the user touches the reset exit button 502, both the smart TV 20 and the mobile phone 10 may exit a current game interface in response to an operation of the user.

Step S68: A user of a device with a higher score within predetermined time wins.

In the technical solution in scenario 2, the mobile phone constructs a local interface of the mobile phone based on the remote view logic information shared by the smart TV. The mobile phone only needs to load the remote view logic information to locally load the interface. Therefore, for the mobile phone end, there is no need to customize, for a game application of the smart TV, a component, a parameter, and the like that are related to the game application, and only the remote view logic information transmitted by the smart TV needs to be loaded. Distributed application logic can be defined for all running applications of the smart TV on the side of the smart TV, and then the smart TV synchronizes the distributed application logic with the mobile phone. In this way, application scenarios are numerous.

Figure 6:
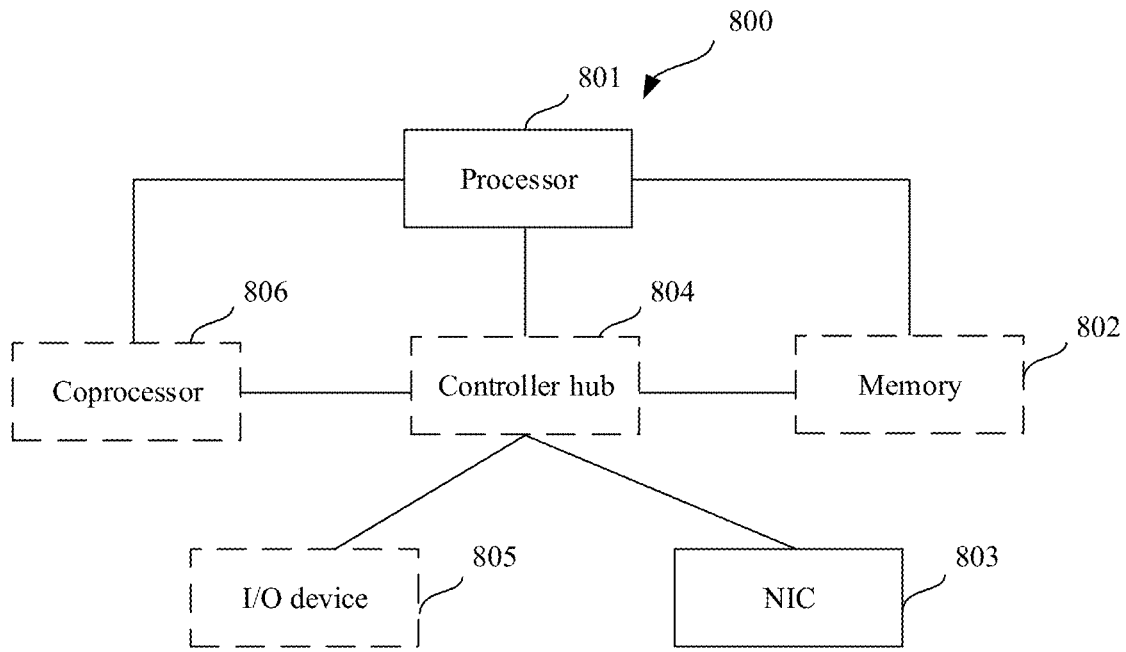
FIG. 6 is a schematic diagram of a structure of an electronic device according to an embodiment of this application.

In some embodiments of this application, an electronic device is further provided. The electronic device in this embodiment of this application is described below with reference to FIG. 6. FIG. 6 is a schematic diagram of a structure of an electronic device according to an embodiment of this application.

For at least one embodiment, a controller hub 804 communicates with a processor 801 by using a multi-branch bus such as a front side bus (FSB), a point-to-point interface such as quick path interconnect (QPI), or a similar connection. The processor 801 executes an instruction for controlling a data processing operation of a general type. In an embodiment, the controller hub 804 includes but is not limited to a graphics memory controller hub (GMCH) (not shown in the figure) and an input/output hub (IOH) (which may be located on separate chips) (not shown in the figure). The GMCH includes a memory and a graphics controller and is coupled to the IOH.

An electronic device 800 may further include a coprocessor 806 and a memory 802 that are coupled to the controller hub 804. Alternatively, one or both of the memory 802 and the GMCH may be integrated into the processor 801 (as described in this application), the memory 802 and the coprocessor 806 are directly coupled to the processor 801 and the controller hub 804, and the controller hub 804 and the IOH are in a single chip.

In an embodiment, the memory 802 may be, for example, a dynamic random access memory (DRAM), a phase change memory (PCM), or a combination thereof. The memory 802 may include one or more tangible and non-temporary computer-readable media for storing data and/or instructions. The computer-readable storage medium stores instructions. Specifically, temporary and permanent copies of the instruction are stored.

In an embodiment, the coprocessor 806 is a dedicated processor, such as a high-throughput MIC processor, a network or communication processor, a compression engine, a graphics processor, a GPU, or an embedded processor. An optional property of the coprocessor 806 is represented by a dashed line in FIG. 6.

In an embodiment, the electronic device 800 may further include a network interface (NIC) 803. The network interface 803 may include a transceiver configured to provide a radio interface for the device 800 to communicate with any other suitable device (such as a front-end module or an antenna). In various embodiments, the network interface 803 may be integrated with another component of the electronic device 800. The network interface 803 may implement a function of a communication unit in the foregoing embodiment.

In an embodiment, as shown in FIG. 6, the electronic device 800 may further include an input/output (I/O) device 805. The input/output (I/O) device 805 may include a user interface, and this design enables a user to interact with the electronic device 800: a design of a peripheral component interface enables the peripheral component to interact with the electronic device 800; and/or a design of a sensor is used to determine an environmental condition and/or position information related to the electronic device 800.

It should be noted that FIG. 6 is merely an example. In other words, although FIG. 6 shows that the electronic device 800 includes a plurality of components such as the processor 801, the controller hub 804, and the memory 802, in actual application, a device that uses the method in this application may include only some of the components of the electronic device 800, for example, may include only the processor 801 and the NIC 803. A property of an optional component is shown by a dashed line in FIG. 6.

In some embodiments of this application, the instructions stored on the computer-readable storage medium of the electronic device 800 may include: an instruction that enables a device to implement the coordinated control methods for electronic devices mentioned in scenario 1 and scenario 2 when at least one unit in the processor executes the instruction. When the instruction is run on a computer, the computer is enabled to perform the coordinated control methods for electronic devices mentioned in scenario 1 and scenario 2.

Figure 7:
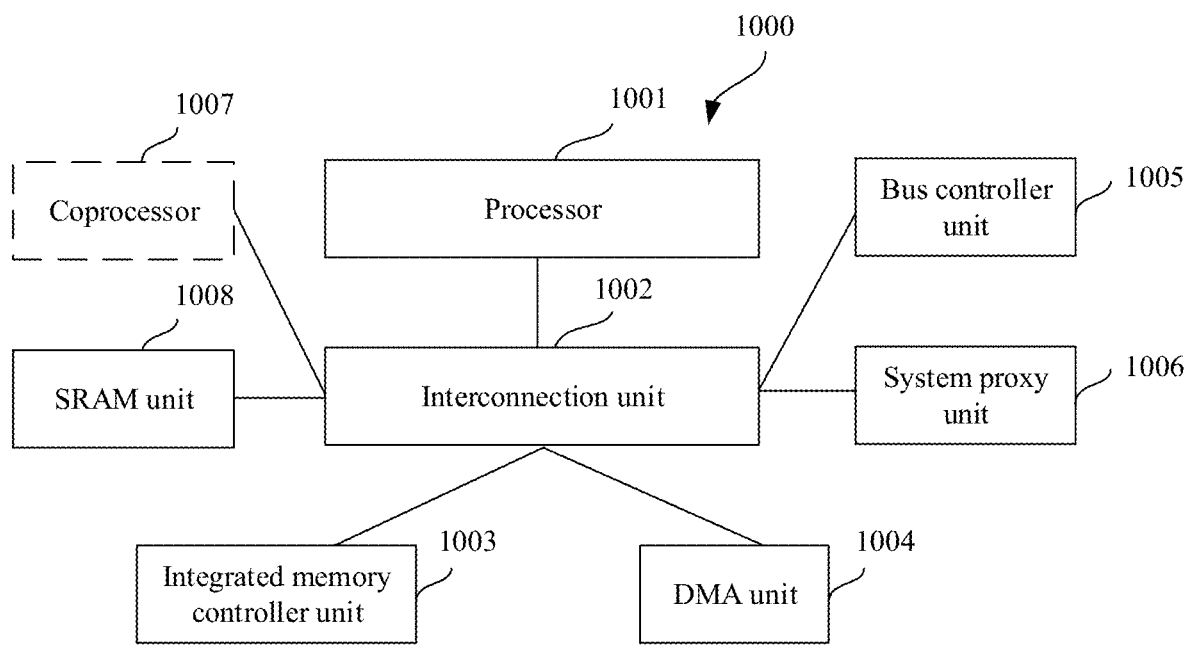
FIG. 7 is a schematic diagram of a structure of a SOC according to an embodiment of this application.

FIG. 7 is a schematic diagram of a structure of a SOC according to an embodiment of this application. FIG. 7 is a block diagram of a SoC (System on Chip) 1000 according to an embodiment of this application. In FIG. 7, similar components have same reference numerals. In addition, a dashed-line frame is an optional feature of a more advanced SoC. The SoC May be used by the electronic device according to an embodiment of this application, and may implement a corresponding function based on instructions stored in the SoC.

In FIG. 7, the SoC 1000 includes: an interconnection unit 1002 that is coupled to a processor 1001, a system proxy unit 1006, a bus controller unit 1005, an integrated memory controller unit 1003, a group of or one or more coprocessors 1007 that may include integrated graphics logic, an image processor, an audio processor, and a video processor, a static random access memory (SRAM) unit 1008, and a direct memory access (DMA) unit 1004. In an embodiment, the coprocessor 1007 includes a dedicated processor, such as a network or communication processor, a compression engine, a GPGPU, a high-throughput MIC processor, or an embedded processor.

The static random access memory (SRAM) unit 1008 may include one or more computer-readable media used to store data and/or instructions. The computer-readable storage medium may store instructions. Specifically, temporary and permanent copies of the instruction are stored.

When the SoC 1000 is applied to the electronic device in this application, the instructions stored on the computer-readable storage medium may include: an instruction that enables the electronic device to implement the coordinated control methods for electronic devices mentioned in scenario 1 and scenario 2 when at least one unit in the processor executes the instruction. When the instruction is run on a computer, the computer is enabled to perform the coordinated control methods for electronic devices mentioned in scenario 1 and scenario 2.

In addition, an embodiment of this application further discloses a computer-readable storage medium. A processing program is stored in the computer-readable storage medium, and when the processing program is executed by a processor, the coordinated control methods for electronic devices mentioned in scenario 1 and scenario 2 are implemented.

The computer-readable storage medium may be a read-only memory, a random access memory, a hard disk, an optical disc, or the like.

What is claimed is:

1. A coordinated control method for electronic devices, wherein the electronic devices comprise a first electronic device used as a controlling party and a second electronic device used as a controlled party that are connected based on near field communication, the coordinated control method comprising:
running, by the second electronic device, an application and triggering coordinated control, and sending remote view logic information associated with the application to the first electronic device, wherein the remote view logic information comprises an interface layout file;
receiving, by the first electronic device, the remote view logic information, locally loading, based on the interface layout file, an interface related to the application, and binding a service that is on a side of the second electronic device and that is related to the application; and
sending, by the first electronic device, control information to the second electronic device based on a service interface externally disclosed by the service, so that the first electronic device controls the second electronic device to run the application;
wherein when running the application, the second electronic device triggers the coordinated control, and
when running the application and triggering the coordinated control, the second electronic device establishes a data physical channel between the second electronic device and the first electronic device based on distributed middleware to transmit the remote view logic information.

2. The coordinated control method according to claim 1, wherein the interface layout file comprises an application control related to the application.

3. The coordinated control method according to claim 2, wherein binding the service that is on the side of the second electronic device comprises:
loading, by the first electronic device, the interface layout file;
constructing, by the first electronic device, a view tree by loading the interface layout file; and
binding, by the first electronic device, the service related to the application while constructing the view tree.

4. The coordinated control method according to claim 2, wherein the first electronic device locally loads the interface based on the interface layout file.

5. The coordinated control method according to claim 1, wherein the control information is transferred by the service interface externally disclosed by the service that is on the side of the second electronic device.

6. The coordinated control method according to claim 5, wherein the first electronic device registers with CallBack related to the second electronic device, the first electronic device transfers an ICallBack handle to the second electronic device through the service interface, and the second electronic device reversely controls the first electronic device by using the ICallBack handle.

7. The coordinated control method according to claim 1, wherein the data physical channel comprises a socket channel.

8. The coordinated control method according to claim 7, wherein before the data physical channel is established between the first electronic device and the second electronic device, the first electronic device performs device trusted authentication and key credential exchange on the first electronic device and the second electronic device by using the distributed middleware.

9. The coordinated control method according to claim 1, wherein the distributed middleware separately provides a platform interface for the second electronic device and the first electronic device, to transfer the remote view logic information through the platform interface.

10. The coordinated control method according to claim 9, wherein the second electronic device transfers the remote view logic information to the first electronic device through the platform interface in a binary digital stream.

11. The coordinated control method according to claim 10, wherein the platform interface implements a cross-process based on a binder mechanism.

12. The coordinated control method according to claim 1, wherein the coordinated control method further comprises:

unbinding, by the first electronic device based on the distributed middleware, the service that is bound on the side of the second electronic device.

13. The coordinated control method according to claim 1, wherein when running the application, the second electronic device refreshes an interface on the side of the second electronic device based on the control information.

14. A coordinated control system for electronic devices comprising:
   a first electronic device used as a controlled party;
   a second electronic device used as a controlled party, wherein the first electronic device and the second electronic device are connected based on near field communication;
   the second electronic device runs an application and triggers coordinated control, and sends remote view logic information associated with the application to the first electronic device, wherein the remote view logic information comprises an interface layout file;
   the first electronic device receives the remote view logic information, locally loads an interface based on the layout file, and binds a service that is on a side of the second electronic device and that is related to the application; and
   the first electronic device sends control information to the second electronic device based on a service interface externally disclosed by the service, so that the first electronic device locally controls the second electronic device to run the application;
   wherein when running the application, the second electronic device triggers the coordinated control, and
   when running the application and triggering the coordinated control, the second electronic device establishes a data physical channel between the second electronic device and the first electronic device based on distributed middleware to transmit the remote view logic information.

15. The coordinated control system according to claim 14, wherein when running the application, the second electronic device refreshes an interface on a side of the first electronic device based on the control information.

16. The coordinated control system according to claim 14, wherein the second electronic device triggers the coordinated control when running a specific application.

17. The coordinated control system according to claim 16, wherein the data physical channel comprises a socket channel.

18. The coordinated control system according to claim 16, wherein the distributed middleware separately provides a platform interface for the second electronic device and the first electronic device, to transfer the remote view logic information through the platform interface.

* * * * *